Aug. 24, 1954   G. W. HOPKINS ET AL   2,687,254
TOTAL TRANSFER MECHANISM
Filed March 20, 1950   9 Sheets-Sheet 1
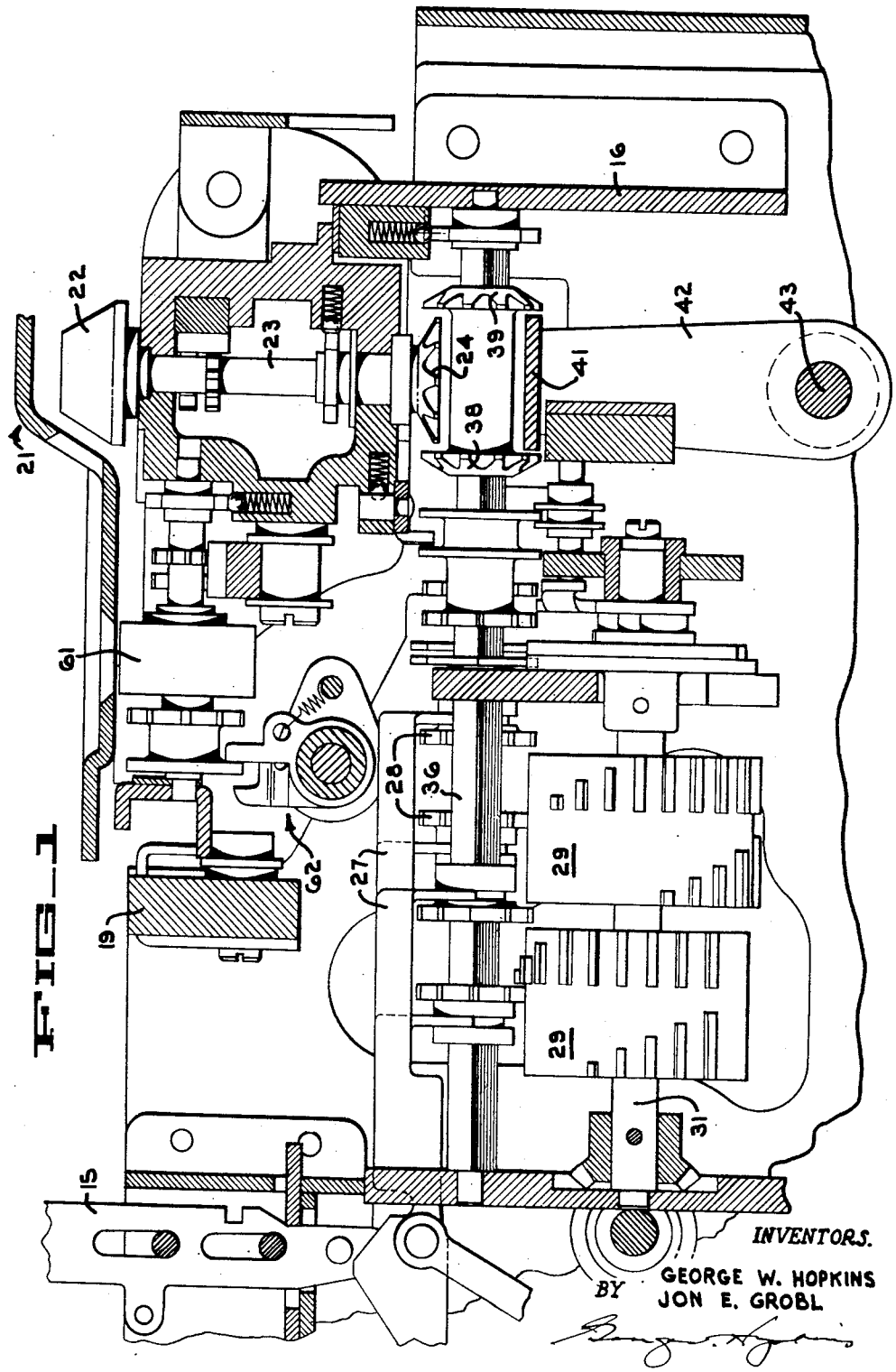
INVENTORS.
GEORGE W. HOPKINS
JON E. GROBL
BY

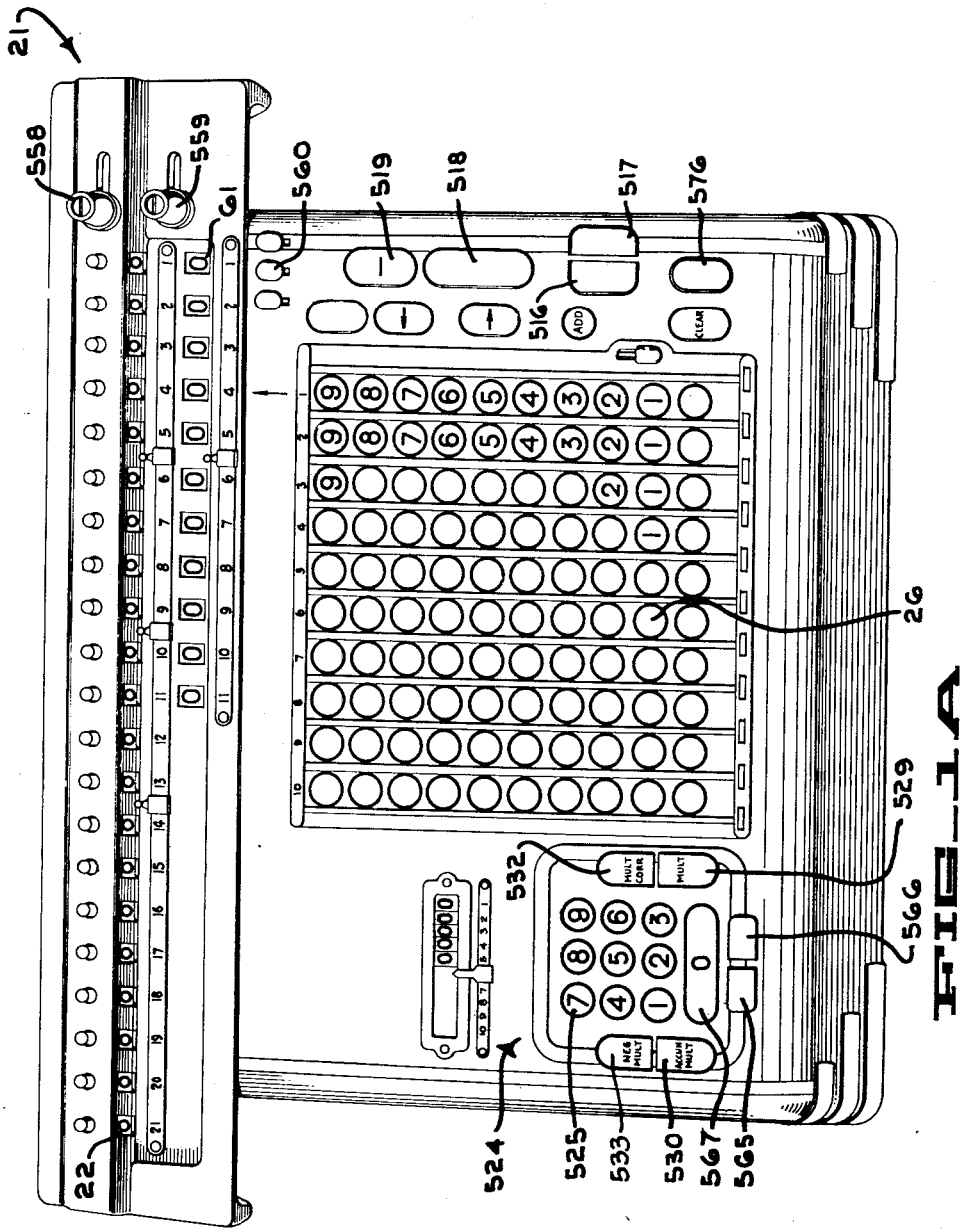

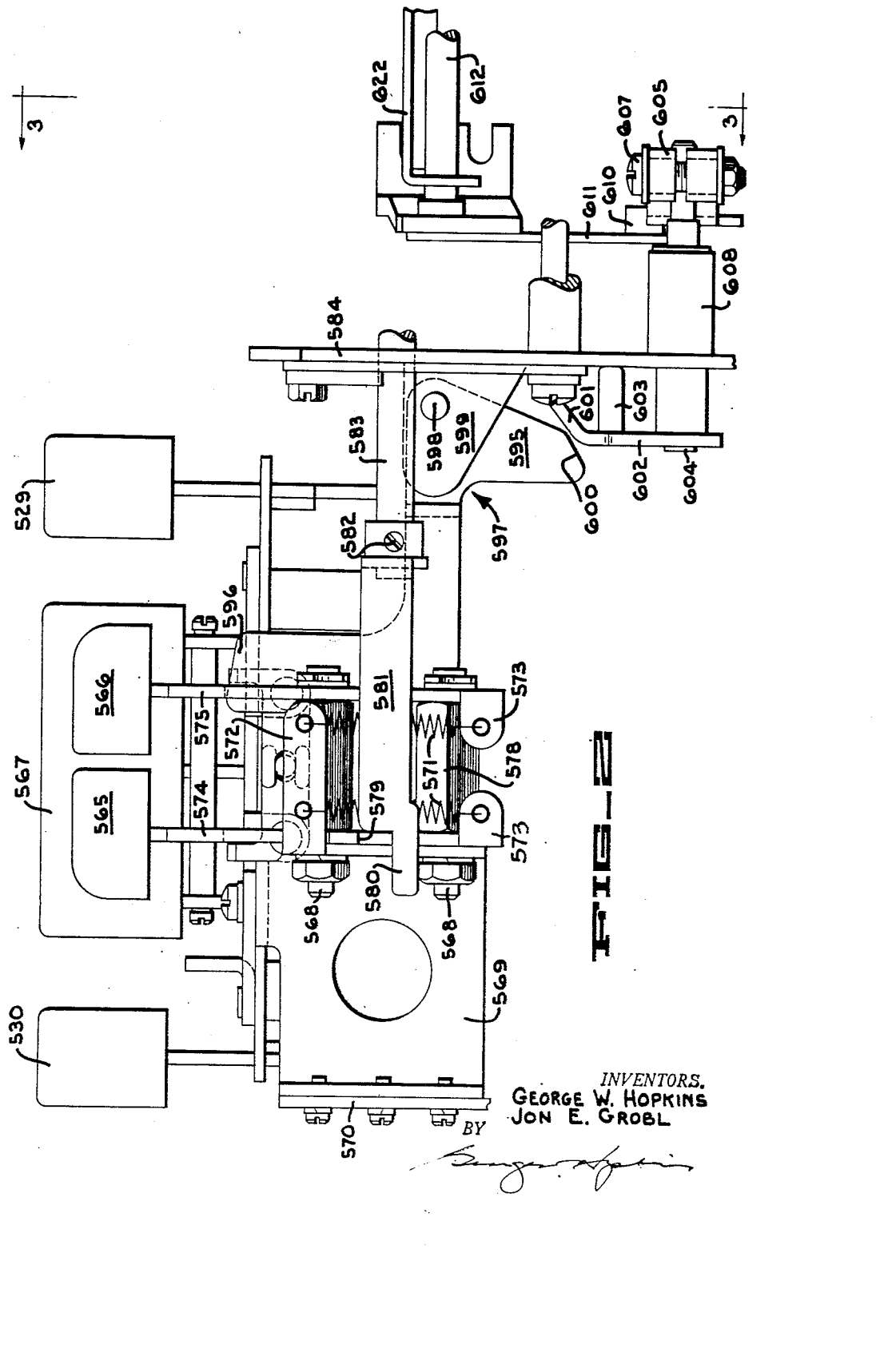

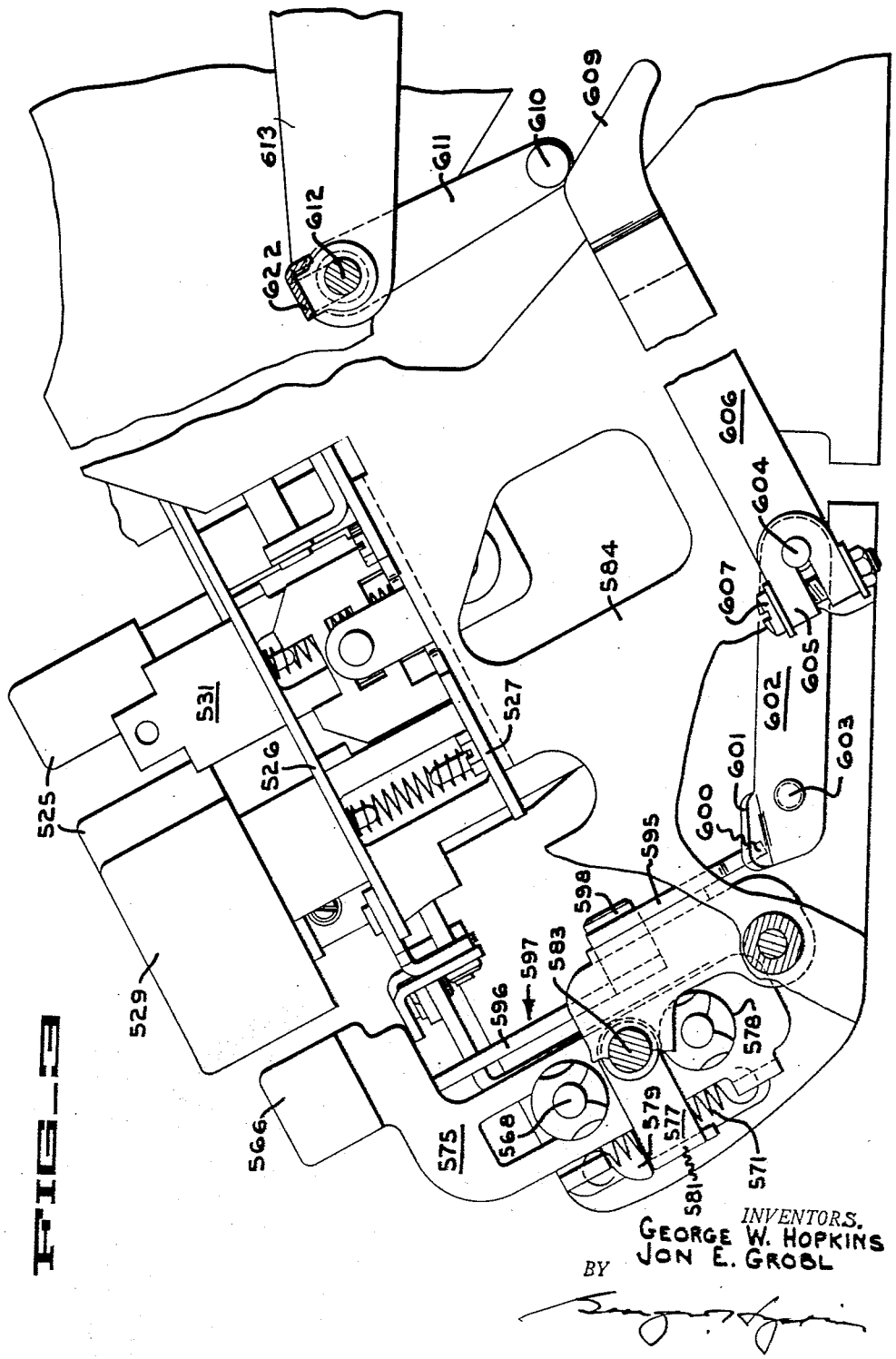

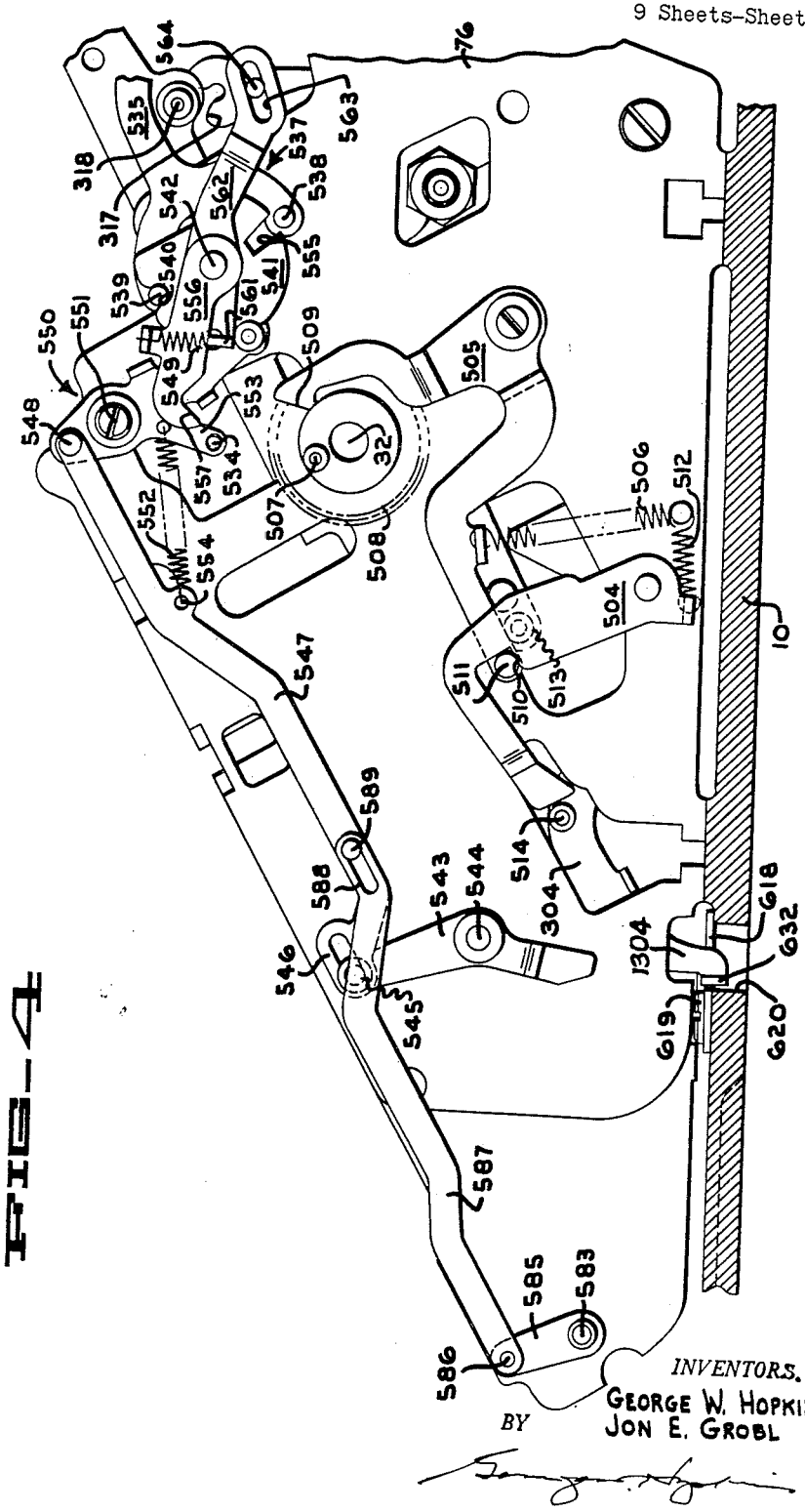

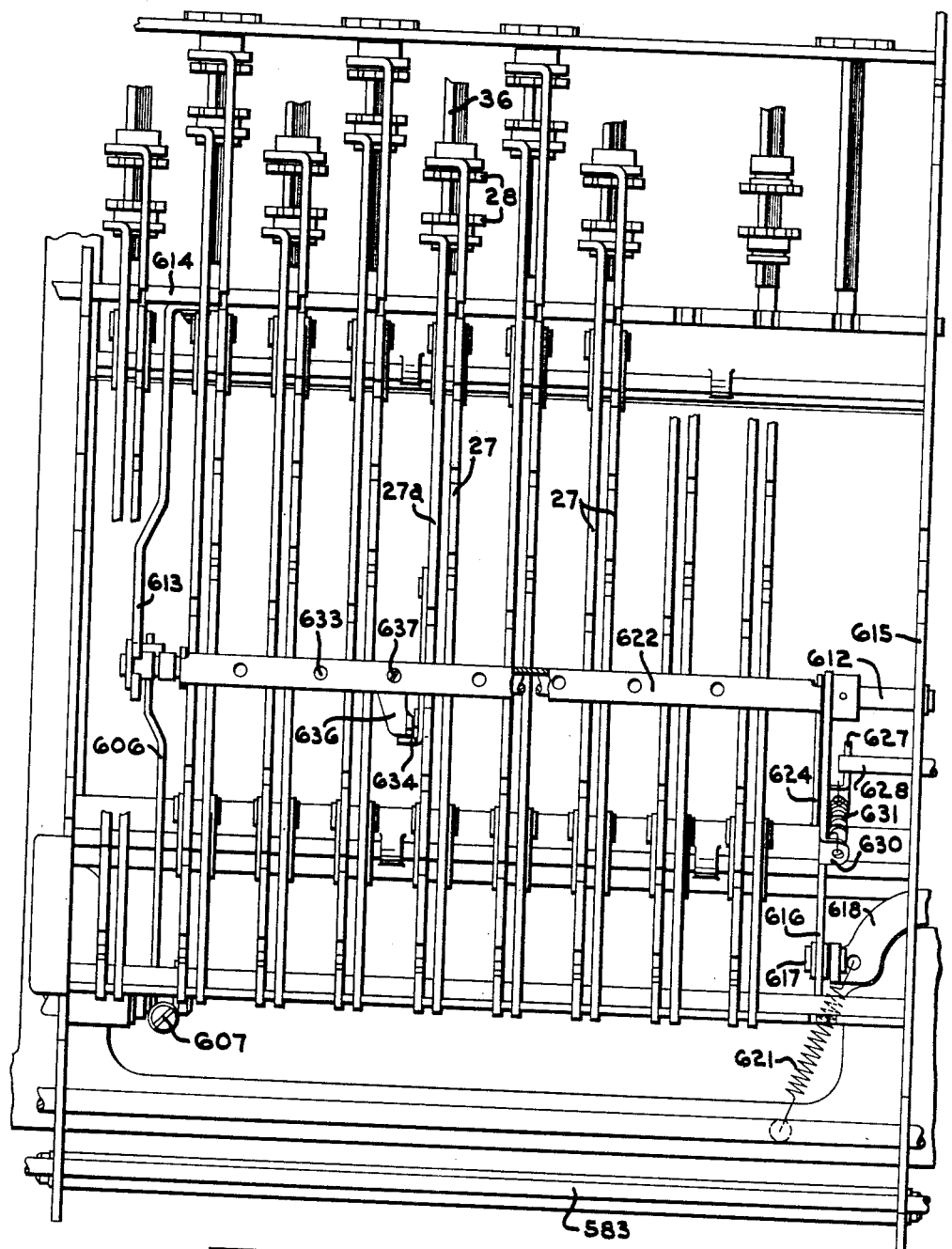

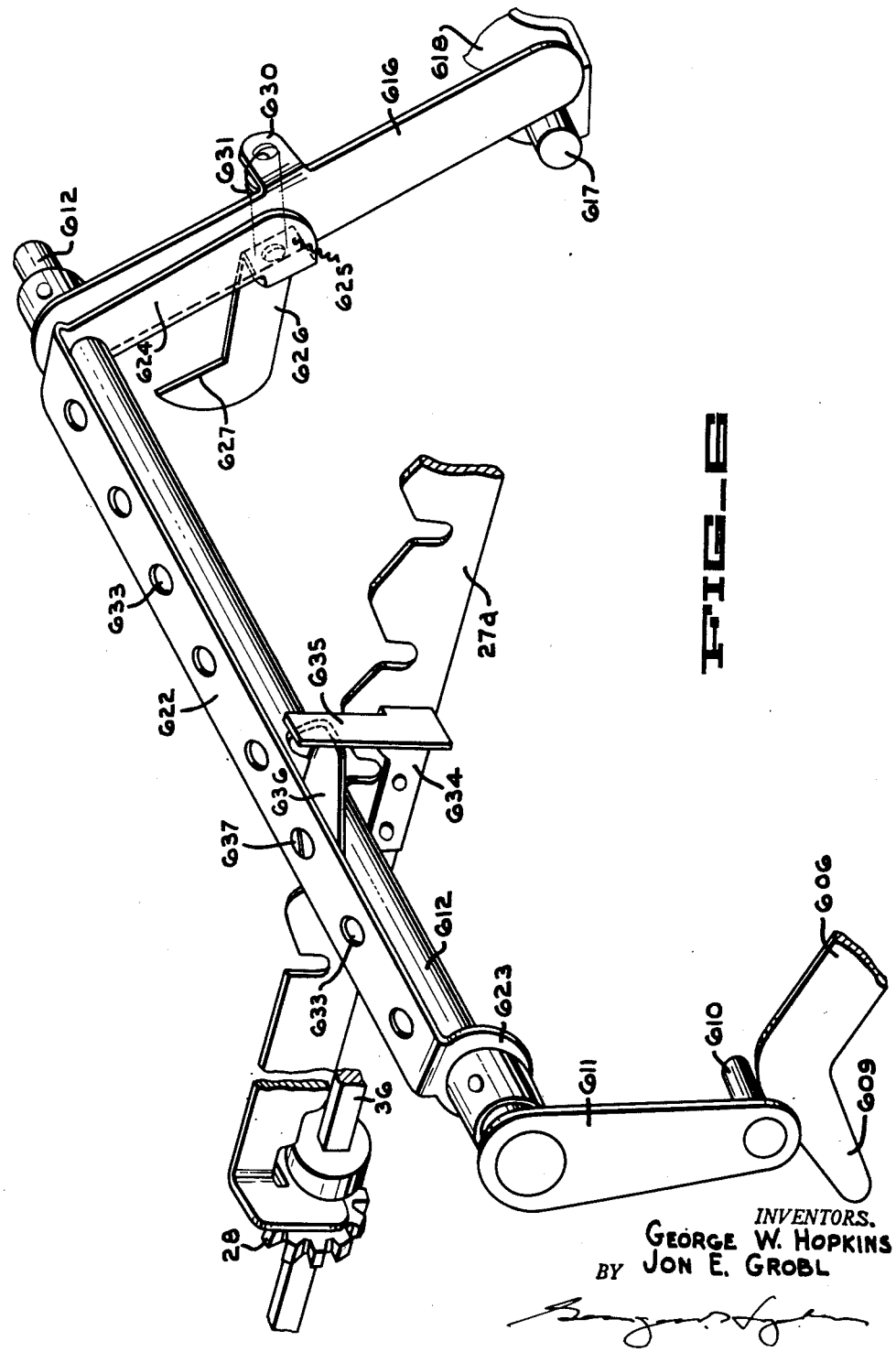

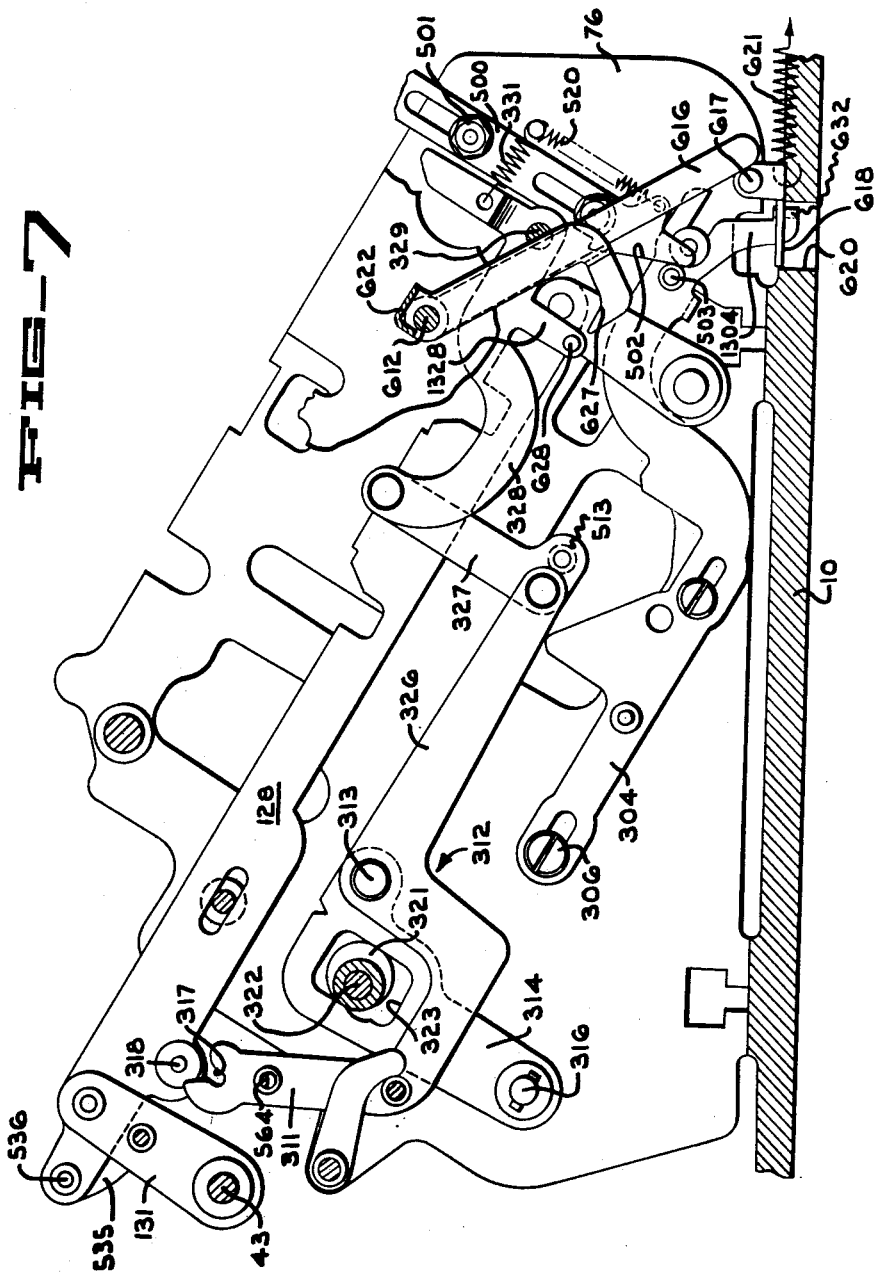

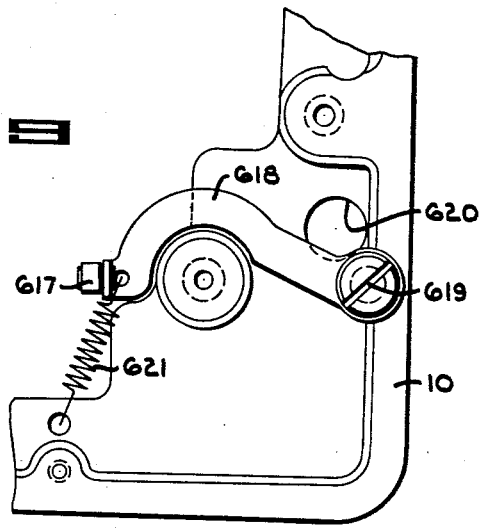
FIG_9
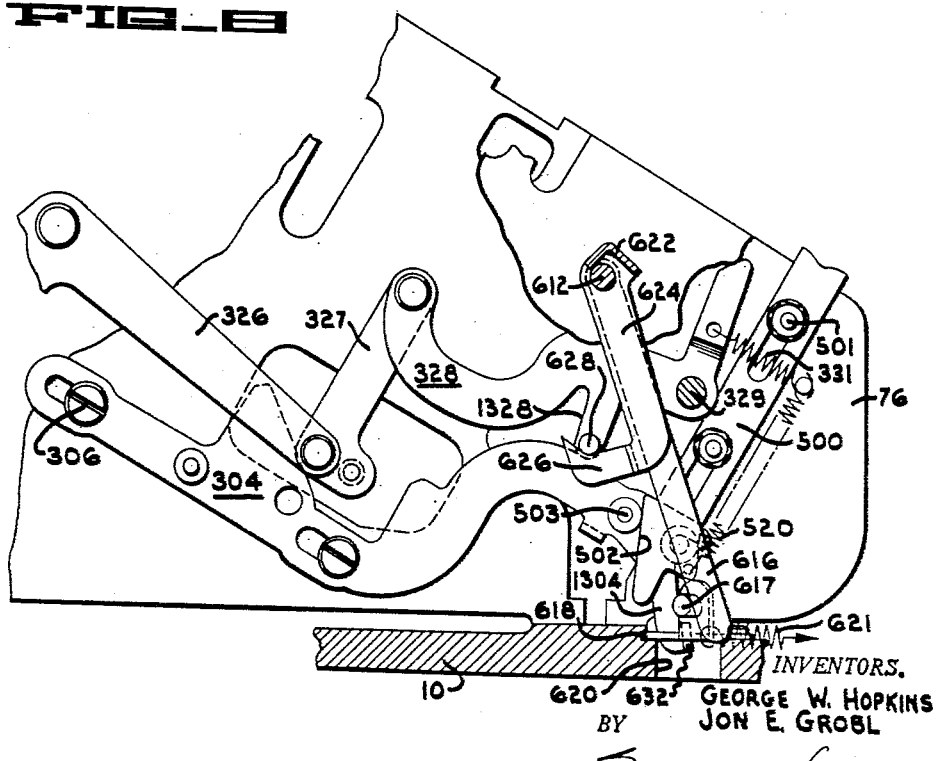
FIG_8
INVENTORS.
GEORGE W. HOPKINS
JON E. GROBL
BY

Patented Aug. 24, 1954

2,687,254

UNITED STATES PATENT OFFICE 2,687,254

TOTAL TRANSFER MECHANISM

George W. Hopkins, San Leandro, and Jon E. Grobl, Oakland, Calif., assignors to Friden Calculating Machine Co., Inc., a corporation of California Application March 20, 1950, Serial No. 150,608

3 Claims. (Cl. 235—63)

This invention relates to improvements automatic calculating machines, and more particularly to an interregister transfer mechanism for performing duplex operations on such a calculating machine by arithmetically accumulating subtotals in one register and grand totals in another register thereof.

In the operation of calculating machines having an automatic division mechanism and a tens-transfer mechanism in the revolutions counter, it is frequently desirable to provide a means for automatically accumulating subtotal values, such as a series of individual products, arithmetically in the accumulator dials of the calculating machine and mechanically transferring such subtotal values to the revolutions counter dials for arithmetic accumulation with grand total values previously transferred and stored therein while performing a series of related computations. Although such a mechanism is particularly useful in connection with the rapid transfer and accumulation in the revolutions counter of positive and negative products resulting from a series of multiplication operations, such an arrangement is also useful in automatically entering a predetermined constant divisor into the selection mechanism of the machine, and in transferring for accumulation and temporary storage within the revolution counter of positive or negative values resulting from addition and subtraction operations, which values may also be arithmetically added to or subtracted from values previously or subsequently transferred to the revolutions counter by such a device.

It is an important object of the present invention, therefore, to provide an interregister transfer mechanism for performing duplex operations on an automatic calculating machine by arithmetically accumulating subtotals in the product register and grand totals in the revolutions counter thereof.

It is another object of the present invention to provide means for arithmetically accumulating subtotal values in the accumulator dials of an automatic calculating machine and mechanically transferring such subtotal values to the revolutions counter thereof for arithmetic accumulation with grand total values previously entered and stored in the revolutions counter.

It is also an object of the invention to provide a manually controlled mechanism which is operable to mechanically enter a predetermined constant divisor into the value selecting mechanism of an automatic calculating machine when so desired by the operator.

It is another object of the invention to provide a manually controlled mechanism for mechanically entering a predetermined constant divisor into the value selecting mechanism of a calculating machine and immediately thereafter initiating an automatic division operation.

It is also an important object of the present invention to provide a rapid means for accurately and automatically transferring values from the accumulator register of a calculating machine to the revolutions counter thereof.

It is another object of the invention to provide a rapid and accurate means of mechanically transferring and accumulating products, or other positive and negative values, in the revolutions counter of a calculating machine.

It is also an object of the invention to provide means for rapidly and automatically transferring products, or other positive and negative values, from the accumulator dials to the revolutions register of an automatic calculating machine, which values are adapted to be set up around the fixed position of a decimal point associated with a predetermined keyboard order.

It is a further object of the invention to provide mechanism for subtotalizing decimal values in the accumulator dials of a calculating machine and mechanically transferring such subtotal values to the revolutions counter for grand totalization therein when so desired by the operator, which values may be rapidly and accurately set up around the fixed position of a decimal point associated with a predetermined keyboard order.

It is still another object of the invention to provide means operable in conjunction with the automatic division mechanism of a calculating machine for selectively transferring positive and negative values having a varying number of decimals from the accumulator dials to the revolutions counter thereof for arithmetic accumulation therein while performing a series of consecutive calculations of the same type, which values may be rapidly and accurately set up around the fixed position of a decimal point associated with a predetermined keyboard order.

It is a further object of the invention to produce an interregister transfer device which is selectively operable in conjunction with the division mechanism of an automatic calculating machine to mechanically transfer to and accumulate in the revolutions counter thereof, various positive and negative values entered into the accumulator dials of such a machine as the result of a series of related addition, subtraction, and multiplication operations.

Further objects are to provide a construction of maximum simplicity, economy and ease of assembly and disassembly, also such further objects, advantages, and capabilities as will fully appear and as are inherently possessed by the device and the invention described herein.

The invention further resides in the combination, construction and arrangement of parts illustrated in the accompanying drawings, and while there is shown therein a preferred embodiment thereof, it is to be understood that the same is illustrative of the invention, and that the invention is capable of modification and change and comprehends other details of construction without departing from the spirit thereof or the scope of the appended claims.

Referring to the drawings:

Fig. 1 is an elevation view of a Friden calculating machine showing the selecting and actuating mechanisms thereof.

Fig. 1A is a perspective view of the calculating machine of Fig. 1 showing the keyboard arrangement.

Fig. 2 is an enlarged front view of the back transfer and multiplication control keys.

Fig. 3 is a right side view of a portion of the control key mechanism taken along the lines 3—3 in Fig. 2.

Fig. 4 is a right side view of the control plate with certain parts removed to show the revolutions counter reversing mechanism.

Fig. 5 is a plan view of the value selecting mechanism showing the arrangement for automatically entering a predetermined value into any predetermined keyboard order immediately prior to the initiation of an automatic division operation.

Fig. 6 is a perspective view showing the value entering mechanism of Fig. 5 to an enlarged scale.

Fig. 7 is a left side view of the control plate of Fig. 4 showing the division control slide in its full-cycle position and out of operative engagement with the interregister transfer mechanism.

Fig. 8 is similar to Fig. 7, but shows the division control slide moved rearwardly by depression of the transfer control key so as to operate the automatic division mechanism and establish an operative connection with the interregister transfer mechanism.

Fig. 9 is an enlarged plan view of a corner of the base plate showing a portion of the mechanism for disengaging the interregister transfer mechanism from the automatic division mechanism upon completion of each transfer operation.

*General arrangement*

The calculating machine selected for illustration in conjunction with the instant invention is of the general type described in Carl M. Friden Patents No. 2,229,890 dated January 28, 1941, and No. 2,371,752 dated March 20, 1945. The general arrangement and operation of such a standard Friden calculating machine is well known, and includes a shiftable register carriage 21, shown in Figs. 1 and 1A, which is mounted for endwise sliding movement on frame brackets 16 and 19 by means of suitable rollers. The register carriage 21 serves to mount the numeral wheels 61 of a revolutions counter having an actuating and tens-transfer means 62 of suitable construction associated therewith. The carriage 21 also mounts a plurality of ordinally arranged accumulator or product register wheels 22 provided with a tens-transfer mechanism of known design, which wheels are suitably journalled in carriage 21 and are adapted for actuation through suitable plus-minus gearing 38, 39 having a sliding driving engagement with square shaft 36 and a reversing engagement with a pinion gear 24 secured to the lower end of each accumulator dial shaft 23. As is fully shown and described in the aforementioned Friden Patent No. 2,229,890, a pair of ten-tooth selection gears 28 are slidably supported for rotation with the square actuating shaft 36 in each order and receive from the associated selection slides 27 differential increments of movement which bear a predetermined relationship to the numerical value of the amount key associated with the key stem 15 which has been depressed in that order, with the result that the stepped teeth on the associated actuating cylinder 29 rotate square shaft 36 to an extent dependent upon the value of the particular amount key 26 which has thus been depressed. The sign character of registration for the accumulator or product register dials 22 is controlled by shifting the plus-minus gearing 38, 39 under the control of a strap or gate 41 which is mounted by suitable upright arms 42 on a transverse rockable shaft 43 which may be controlled by the respective plus and minus keys 518, 519 (Fig. 1A), or in any other convenient manner in performing calculating operations.

The machine shown in the accompanying drawings is also provided with an automatic division mechanism which enables a dividend set up on the accumulator or product register wheels 22 to be automatically divided by the method of successive subtraction by a divisor set up on the amount keys 26. Such an automatic division mechanism is fully described in the aforementioned Patent No. 2,229,890, and operates to control the functioning of the machine so as to cause the divisor to be repeatedly subtracted from the dividend until an overdraft occurs in the accumulator, whereupon the overdraft is corrected and the carriage 21 is shifted one ordinal space to the left and the process is repeated. The number of division cycles thus effected in each order is registered in the revolutions wheels 61 as the quotient, and the division operation is automatically controlled by a mechanism which becomes effective each time an overdraft occurs in the accumulator 22 to program the operation of the add-subtract mechanism and the carriage shift mechanism in accordance with the intermittent motion of control cam 321 (Fig. 7), as is fully described in the aforementioned Patent No. 2,229,890, so as to control the uninterrupted cyclic operation of the machine.

The automatic division operation in such a machine is normally initiated by the depression of a division key 516 (Fig. 1A) attached to the top of a key stem 500 (Figs. 7 and 8) supported for endwise sliding movement on the control plate 76 by the pin-and-slot connections 501 and normally moved to its uppermost or undepressed position by spring 520. Key stem 500 is provided at its lower end with a beveled cam surface 502, which upon depression of the division key 516 engages with a stud 503 provided on a division setting slide 304 supported for predetermined longitudinal sliding movement on the control plate 76 by the pin-and-slot connections 306, whereupon slide 304 is moved rearwardly from its normally inactive position shown in Fig. 7 to the active position illustrated in Fig. 8. Slide 304 is provided with a roller stud 514 (Fig. 4) which is operable upon depression of key 516 to release a notch 510 on arm 504 from latching engagement with a coacting stud 511 carried by the forwardly extending arm of a normally latched power member 505 so as to enable the latter to be rocked (counter-clockwise in Fig. 4) under the urgency of the relatively strong spring 506 so as to initiate an automatic division operation. During each such division operation a roller 507 on a power-driven gear 508, which is adapted to undirectionally rotate the main drive shaft 32 through a suitable main control clutch, contacts the upper cam surface 509 provided on the upwardly extending arm of the power member 505 to rock the latter in opposition to the action of spring 506 so as to restore member 505 to its normally inactive position wherein stud 511 is caused to re-engage with notch 510 as latch arm 504 is urged in a counterclockwise direction by spring 512. As shown in Fig. 7, an arm 314 pivotally supported on control plate 76 by the pin 316 has an aperture 323 therein adapted to coact with an eccentric cam 321 carried by the automatic division programming control shaft 322, which arm 314 carries a pin 313 which forms a pivotal support for a connecting lever 312. The front arm 326 of this lever 312 is pivotally connected to the lower end of a link 327 carrying a roller 513 which is adapted to be urged downwardly by spring 506 (Fig. 4) whenever notch 510 on arm 504 is released from latching engagement with pin 511 by the rearward movement of division control slide 304. The upper end of lever 327 is pivotally connected to a bellcrank lever 328 which is urged clockwise by a spring 331 (Fig. 7) and is free to turn about a pin 329 mounted on control plate 76, which lever 328 has an upwardly extending arm adapted to abut against a pin carried by a longitudinally movable slide, not shown, for simultaneously controlling the operation of the main clutch and the electric motor which drives the machine. The rearward end 311 of lever 312 is provided with a notch 317 adapted to engage with a pin 318 carried by a longitudinally movable plus-minus slide 128, which slide is pivotally supported at its rear end on an arm 131 which rocks with the plus-minus control shaft 43. Thus, rearward movement of the division control slide 304 operates through roller 513 to rock lever 312 (clockwise in Fig. 7) so as to move notch 317 into engagement with pin 318 on slide 128, which latching engagement continues after slide 304 is restored to the inactive position shown in Fig. 7 and is maintained until the predetermined sequence of operations in automatic division has been completed.

As shown in Figs. 1A, 2 and 3, the calculating machine selected for use with the instant invention is preferably also provided with mechanism of the type illustrated in Friden Patent No. 2,371,752 for performing predetermined automatic multiplication of a value previously entered into the machine keyboard. In such a machine, a multiplying operation is conditioned or enabled by selectively depressing the multiplier keys 525 in the desired sequence, which keys are preferably arranged in a 3 x 3 square located to the rear of the "0" multiplying key 567, each such multiplier key being slidably mounted in the upper and lower plates 526, 527 of the multiplier keyboard unit 524 and normally urged toward its undepressed or inactive position by a suitable compression spring. Thereafter, the automatic multiplying operation is started by depressing one of the positive or negative multiplier keys 529, 530, or 533 as shown and described in the patent to Friden et al. No. 2,399,917 issued May 7, 1946, or if it is desired to correct an erroneously entered multiplier figure, a multiplier correction key 532 attached to the top of key stem 531 (Fig. 3) may be depressed to zeroize the multiplier selection mechanism. Such a machine is also provided with a manually controlled means for rendering the revolutions counter 61 effective or ineffective during operation of the machine, which control mechanism preferably is of the type shown and described in Anthony B. Machado Patent No. 2,366,345 dated January 2, 1945, the control key for which may be located in any convenient position on the machine, as at 560 in Fig. 1A.

*Auxiliary counter control mechanism*

In performing division operations in such calculating machines it is generally desirable to obtain true figure quotients, and for this purpose there is usually provided an automatic control whereby the registrations on the revolutions counter wheels 61 are of opposite sign and are set to be positive at the same time that the accumulator dials 22 are registering subtractively. Such a revolutions counter control mechanism is fully shown and described in Friden Patent No. 2,294,111 dated August 25, 1942, and includes a control arm 535 (Fig. 4) pivotally secured by the pin 536 (see also Fig. 7) to the rear end of plus-minus slide 128, which arm 535 is provided with a semicircular counter shifting member 537, the lower segment of which carries a pin 538, and the upper segment of which is provided with a pin 539 urged by a suitable tension spring acting downwardly on arm 535 so as to normally retain pin 539 in engagement with the upper slot 540 provided in a counter setting member 541 affixed to a transverse rod 542 which controls the registration of the revolutions counter 61. Thus, rearward movement of slide 128 normally imparts a clockwise rocking movement to rod 542 (Fig. 4) while the forward movement thereof rocks rod 542 counter-clockwise, with the result that the accumulator or product register dials 22 and the revolutions counter dials 61 have the same sign registration whenever pin 539 is thus retained in engagement with upper notch 540.

Mechanism is provided, however, for selectively reversing the registration of the counter dials 61 with respect to the accumulator dials 22 during automatic division, interregister transfer operations, and other specialized computations. In performing automatic division operations by the successive subtraction method, for example, it is desirable that the revolutions counter dials 61 register in a positive sense whenever the plus-minus slide 128 is moved forwardly so as to cause the accumulator dials 22 to register subtractively. As is fully described in the afore-mentioned Patent No. 2,294,111, a counter-control key 517 (Fig. 1A) preferably is provided conveniently adjacent to the division control key 516 so that both keys may be manually depressed at substantially the same time while initiating an automatic division operation. This independently operable key 517 for reversing the registration of the revolutions counter 61 imparts a counter-clockwise rocking movement to a bellcrank 543 pivoted on control plate 76 as at 544 (Fig. 4) and carrying at its upper end a stud 545 which engages with the one end of oblong slot 546 to urge forwardly a long link 547 pivotally connected as at 548 to the upper end of a latching bellcrank 550 which is free to rock about a machine screw 551 mounted on control plate 76 and carrying a washer at the outer end thereof.

Bell crank 550 is urged in a clockwise direction about screw 551 by a coil spring 552 (Fig. 4), one end of which is secured to the downwardly depending arm 553 of bellcrank 550, and the other end of which is secured at the point 554 to link 547. Bellcrank 550 is also provided with a rearwardly extending latching finger, not shown, which is operable upon the counterclockwise rotation thereof to engage with and lift pin 539 out of upper notch 540, in opposition to the action of the resilient pressure acting downwardly on arm 535, while also moving the pin 538 on the lower segment of yoke 537 into engagement with a lower notch 555 provided on the lower surface of counter setting member 541 in a position substantially diametrically opposed to the upper slot 540. Means is also provided for retaining pin 538 in engagement with notch 555 during automatic division operations so that a reversed rocking movement is imparted to counter-control rod 542 by the longitudinal movement of plus-minus slide 128, and for this purpose there is provided a latching lever 556 rotatably mounted on the outer end of control shaft 542 and having at its free end a notch 557 adapted to be urged by spring 549 into latching engagement with a pin 534 extending outwardly from the lower end of bellcrank arm 553. Spring 549 is secured at its upper end to lever 556 and at its lower end to a lug 561 which projects outwardly from the forward end of lever 562 (Fig. 4) also pivotally supported on the counter-control shaft 542, which lever is provided at its rear end with an oblong slot 563 which slidably engages with a pin 564 (see also Fig. 7) which extends outwardly from the rear end 311 of connecting lever 312. Thus, whenever notch 317 is moved into engagement with pin 318, as by a depression of the division control key 516 along with the counter-control key 517, pin 564 rocks lever 562 and lug 561 thereon counter-clockwise (Fig. 4), which lug tensions spring 549 so that lever 556 rocks counter-clockwise along with lever 562 to move notch 557 into latching engagement with pin 534, while pin 538 is also retained in engagement with notch 555 so that the accumulator dials 22 and the revolutions counter 61 have opposite sign registration for the duration of the automatic division operation. If only the division control key 516 is depressed, however, the rocking movement imparted to arm 562 by pin 564 causes the nose of arm 556 to be rocked into the path of pin 534 and prevents counter-clockwise rotation of bell crank 550. Thus pin 539 remains in its normal position in engagement with upper notch 540, in which event the same sign registration is provided for the accumulator or product register dials 22 and the revolutions counter dials 61, in which case the latter records the complement of the true quotient. At the end of an automatic division operation, or at the end of a series of operations involving the accumulation of a plurality of quotients, products, or other values in a manner to be hereinafter more fully described, connecting arm 312 rocks counter-clockwise to move the notch 317 thereon out of engagement with pin 318 (Fig. 7), pin 564 rocks arm 562 (clockwise in Fig. 4) in such a manner that ear 561 rocks lever 556 so as to move notch 557 out of engagement with pin 534, thus returning the components of the counter and division control mechanisms to the full-cycle position illustrated in Fig. 4 wherein the same sign registration is normally provided for both the accumulator dials 22 and the revolutions counter dials 61.

An auxiliary means for controlling the sign character registration of the revolutions counter 61 is also provided, the control key 565 for which is preferably located in predetermined close proximity to the multiplier unit 524 (Fig. 1A) so as to facilitate the transfer and arithmetic accumulation of products and other values in the revolutions counter dials 61. Such an auxiliary revolutions counter-control key 565 is shown in Fig. 2 located immediately adjacent to and on the left side of the right-hand transfer control key 566, the keys 565, 566 preferably being located just forward of the zero key 567 of the multiplier unit, which transfer keys 565, 566 preferably are provided with a suitable mechanical interlock so that the "0" multiplier key 567 cannot be depressed at the same time as either of the keys 565, 566. These transfer control keys 565, 566 (Fig. 2) have respective key stems 574, 575 supported for endwise sliding movement by a pair of slotted spacers 578 secured by bolts 568 to a supporting bracket 569 (Fig. 2) suitably mounted on the side frame 570 of the machine. Each of the transfer key stems 574, 575 is normally retained in its inactive or undepressed position by a tension spring 571 having its upper end anchored on a lug 572 extending outwardly from bracket 569 and having its lower end secured to an ear 573 provided on the bottom of the associated key stem. Key stem 574 has extending forwardly therefrom a lug 579 (see also Fig. 2) which is operable upon depression of the left transfer key 565 to engage the coacting outer end 580 of a bail 581 (Fig. 2) having a right angle extension 577 on its other end adjustably secured by a screw 582 to a rod 583 rotatably supported at one end by the auxiliary inner frame 584 and at its other end by the control plate 76, which rod 583 extends transversely across the front end of the machine in the manner illustrated in Fig. 5. The rod 583 projects outwardly beyond the forward end of plate 76 and has secured to its right end a rocker arm 585 (Fig. 4) having its free end secured by a pin 586 to the front end of an auxiliary control link 587, the other end of which is provided with an oblong slot 588 which engages with a pin 589 mounted on link 547. It will thus be seen that upon a depression of the left transfer control key 565, rod 583 and arm 585 are rocked (counter-clockwise in Fig. 4) to move links 587 and 547 forwardly in such a manner as to rock latching bellcrank 550 and reverse the registration of the revolutions counter by bringing pin 538 into engagement with notch 555, during which operation a lost motion connection is provided by pin 545 on bellcrank 543 and oblong slot 546 at the forward end of link 547. In this manner an auxiliary control is provided which allows the registration of the revolutions counter wheels 61 to be selectively reversed either by a control key 517 located adjacent to the division control key 516, or by the depression of the left transfer control key 565 which is located just forward of the automatic multiplier unit 524 and to the left of transfer key 566 (Fig. 2).

Interregister transfer mechanism

Mechanism is provided for selectively transferring positive or negative subtotal values from the accumulator or product register dials 22 to the revolutions counter dials 61 for accumulation and totalization with grand total values previously transferred and stored therein by the operator of the calculating machine. Although the transfer keys 565, 566 (Fig. 2) are most frequently used in conjunction with an automatic multiplier unit of the type shown and described in the afore-mentioned Friden Patent No. 2,371,752 so as to transfer and arithmetically accumulate positive and negative products in the accumulator dials 61, the transfer keys 565, 566 may also be used for transferring and accumulating as grand totals in the revolutions counter 61 a series of quotients, or other subtotal values resulting from addition and subtraction operations.

In performing such inter-register transfer operations, it is desirable to make use of the automatic division mechanism of the machine, which preferably is of the type shown and described in the afore-mentioned Patent No. 2,229,890. In performing a computing operation by this method, it has been the practice heretofore to enter a value of "1" in a predetermined order of the keyboard as at 26 (Fig. 1A) followed by a depression of the division key 516 and counter-control key 517. Thus, initiation of the division operation transfers a subtotal from the product register 22 into the revolutions counter 61 as a quotient.

The mechanism of the instant invention eliminates the necessity of performing the manual operation required to enter the value of "1" into a predetermined order of the keyboard. By depression of the transfer keys 565, 566 (Figs. 1A and 2) simultaneously a value of "1" is automatically entered into the selection mechanism, the revolutions counter 61 is conditioned for positive registration, and a division operation is initiated.

Referring now to Figs. 2 and 3, it will be observed that the right transfer key 566 is located just forward of the automatic multiplier unit and in close proximity to, but on the right of the interregister transfer key 565 which forms a convenient split-key arrangement therewith. As shown in Fig. 3, the key stems for both transfer keys 565, 566 are offset and extend rearwardly toward the multiplier zero key 567. Upon depression of transfer key 566 the lower horizontal surface of the associated key stem 575 engages with the top arm 596 (Fig. 3) of a bellcrank 597 pivoted as at 598 (Fig. 2) on a bracket 599 suitably secured to the auxiliary frame 584. Bellcrank 597 has a downwardly depending arm 595 provided with a beveled lower surface 600 operable to engage with the coacting inwardly flanged ear 601 provided on a rocker arm 602 which is maintained a predetermined spaced distance away from the frame 584 by the spacer pin 603 (see also Fig. 3). Arm 602 is affixed to one end of a short shaft 604 which extends through a suitable journal 608 mounted on auxiliary frame 584, the other end of shaft 604 being secured to a clamp fitting 605 provided on one end of a rocker arm 606 which may be adjustably positioned on shaft 604 by means of machine screw 607. Rocker arm 606 is provided at its free end with an angularly downwardly beveled cam surface 609 (Figs. 3 and 6) which coacts with a pin 610 on an arm 611 having its other end secured to a shaft 612 (see also Fig. 5) extending transversely across the bed of the keyboard in a predetermined position above the spring-urged actuator slides 27 (Figs. 1 and 5) of the selecting mechanism. Shaft 612 is journalled at one end in a bracket 613 (Fig. 5), extending forwardly from the crossframe 614 of the machine, and is rotatably supported at its other end in the keyboard side frame 615. Thus, upon the depression of the right transfer key 566, bellcrank 597 is rocked (counter-clockwise in Fig. 2) so as to turn shaft 604, arm 602, and arm 606 so that the cam surface 609 thereon imparts a corresponding counter-clockwise movement to arm 611 and shaft 612 as viewed in Fig. 3. Shaft 612 has thereto pinned or otherwise secured thereto in a position adjacent to side frame 615 (Fig. 5), a forwardly and downwardly depending arm 616 (Figs. 5, 6, and 8), the lower end of which presses against a roller stud 617 carried by the free end of a return arm 618 (see also Fig. 9) pivotally supported on a screw 619 mounted on a base plate 10 having a hole 620 drilled therein adjacent to screw 619. A tension spring 621 having one end secured to base plate 10 and its other end to return arm 618 continually urges the latter in a counter-clockwise direction as viewed in Fig. 9.

Referring now to Figs. 5 and 6, it will be observed that shaft 612 is provided with a relatively long and transversely disposed flanged bail 622 supported for free rocking movement above shaft 612 by a downwardly depending end flange 623 and an oppositely disposed and downwardly depending latch arm 624, both of which are drilled to freely receive and turn on the supporting shaft 612. Latch arm 624 is disposed generally parallel to arm 616 (Fig. 6) and is provided at its lower end with an offset ear 625 which extends across the rear edge of arm 616 and supports a right angle extension 626 provided at its free end with a hook 627 adapted to form a latching engagement with a coacting pin 628 projecting inwardly from the lower end of a downwardly depending extension 1328 provided on lever 328 (Figs. 7 and 8) of the automatic division mechanism, the operation of which is more fully described in the afore-mentioned Friden Patent No. 2,229,890. The forward edge of arm 616 is provided with an ear 630 (Fig. 6) which engages with one end of a coil spring 631, the other end of which is secured to the offset ear or lug 625 which connects arm 624 with its hook extension 626. Thus, spring 631 tends to yieldably retain ear 625 in engagement with the coacting rear edge of arm 616, so that arms 624 and 616 are normally retained substantially parallel and bail 622 is normally maintained in a substantially horizontal position above its supporting shaft 612. It will be recalled that division control slide 304 is operable to initiate an automatic division operation upon rearward movement from the inactive position shown in Fig. 7 to the active position illustrated in Fig. 8. This slide 304 is provided at its forward end with a downwardly depending extension 1304 having an ear 632 thereon which extends downwardly into hole 620 in base plate 10 and coacts with the adjacent edge of the spring-urged return arm 618 (Figs. 4, 7, 8, and 9). Thus, clockwise movement of arm 618, as viewed in Fig. 9, tensions the return spring 621 and causes arm 618 to move slide 304 rearwardly to the active position shown in Fig. 8, thereby causing operation of the automatic division mechanism in the manner hereinbefore described.

Referring now to Figs. 5 and 6 it will be apparent that bail 622, which is rotatably supported by shaft 612 transversely across all keyboard orders of the machine, is provided with a series of equidistantly-spaced holes 633, each of which corresponds to a particular keyboard order. Thus, it is readily apparent that a camming member such as that shown at 636 in Fig. 6 may be secured to the bail 622 in one or more keyboard orders for operative engagement with the selection mechanism associated therewith. Each of such camming members may be formed to move its associated selection slide 27 or 27a a differential amount to enter a preselected value from "1" to "9" in the selection mechanism. This automatic entry of a constant factor into the selection mechanism for use in division operations will be hereinafter described.

As a fully shown and described in the above-mentioned Friden Patent No. 2,229,890, the key stems 15 for each bank of keys 26 (Fig. 1) cooperate with the associated selection mechanism of the machine, which mechanism includes for each keyboard order a pair of spring-urged value selecting slides 27 mounted for endwise movement in such a manner as to differentially position the associated selection gears 28 in accordance with the value of the amount key 26 which has been depressed in that order. A pair of associated stepped-drum actuating cylinders 29 are mounted on an actuating shaft 31 suitably journalled in the bed of the machine and adapted to be rotated by an associated driving mechanism of the unidirectional cyclic type. In the normal operation of such a calculating machine, values set into the selecting mechanism by depressing the amount keys 26 (Fig. 1) will be introduced into the accumulator or product register dials 22 by the cooperation of selection gears 28 with the associated stepped drums 29 of the actuating mechanism, the gears 28 of each pair being slidably mounted on the associated square shaft 36. As viewed in Fig. 5, the left-hand selection slide 27 of each pair is operable to position the forward selection gear 28 on square shaft 36 so as to cause the entry of keyboard values 1–5 into the accumulator dials 22, whereas the right-hand selection slide 27 of each pair positions the rear selection gear 28 on the associated shaft 36 to effect the entry of keyboard values 6–9 into the accumulator dials. In some applications, however, it may be desirable to use a selection slide 27 in only one keyboard order.

The left-hand selection slide 27a for a predetermined keyboard order, such as the sixth inboard order of the machine, has riveted or otherwise suitably secured to the lower portion thereof a lug, bracket or other interposable member 634 (Fig. 6) having an upwardly disposed leg 635 which at all times extends above the level of bail 622. A forwardly extending plate or cam-actuating member 636 is adjustably and removably secured to the bail 622 by means of a screw 637 inserted through the hole 633 corresponding to the particular keyboard order which has been preselected for association with the interregister transfer mechanism, which member 636 is operable to automatically position the coacting selection slide 27a during each transfer operation in the manner now to be described.

Operation

In operation, the numeral wheels 22 and 61 in the laterally shiftable register carriage 21 are automatically or manually cleared and zeroized at the beginning of a series of related computing operations which, for example, may involve the transfer to and totalization in the revolutions counter dials 61 of a series of positive and negative products. Although the operation of the interregister transfer mechanism will now be described in connection with the transfer and arithmetic accumulation of products using the value of "1" as a constant divisor, it will be readily apparent that the transfer keys 565, 566 can also be used to automatically enter any predetermined constant divisor factor into the selection mechanism of the machine. Positive and negative values in the accumulator resulting from a series of related addition, subtraction, or division operations, or various combinations thereof may be transferred to and accumulated in the revolutions counter dials 61 by using the value of "1" as a constant divisor. While registering products or subtotals in the accumulator dials 22 it is preferable, in connection with the instant invention, to disable the revolutions counter actuator mechanism during the computing operation. The foregoing is accomplished in all operations, with the exception of automatic division, by moving the counter blockout key 569 (Fig. 1A) rearwardly, as is fully shown and described in the afore-mentioned Machado Patent No. 2,366,345, which blocking action is effective until such time as it is desired to transfer the resulting product to the revolutions counter dials 61 for arithmetic accumulation therein.

The multiplicand is entered into the keyboard by depression of keys 26, thereafter the multiplier is entered into the machine by depressing the value keys 525 in predetermined sequence and the automatic multiplication operation is initiated by depressing one of the multiplication control keys 529, 530, or 533 as described in the afore-mentioned Patent No. 2,399,917. The resulting positive or negative product is automatically entered as a subtotal value into the accumulator, or product register dials 22, which subtotal value will thereafter be transferred to the revolutions counter dials 61 and arithmetically accumulated therein as a grand total in the manner now to be described.

Whenever it is desired to automatically transfer such a product or other value positively from the accumulator or product register dials 22 to the revolutions counter wheels 61, the transfer keys 565 and 566 are depressed at substantially the same time by a single stroke of the operator's hand. The depression of the left transfer key 565 (Fig. 2) rocks bail 581, shaft 583, and arm 585 in such a manner as to move links 587 and 547 forwardly so as to rock bellcrank 550 (counter-clockwise in Fig. 4) and to cause the rearwardly extending finger thereon to lift pin 539 and move pin 538 into engagement with lower notch 555. Hence, the revolutions counter dials 61 are thereby conditioned for positive registration while the accumulator dials 22 are registering subtractively during the automatic division operation which immediately follows. Depression of the right transfer key 566 (Fig. 2) causes a forward movement of selection slide 27a equivalent to a depression of the "1" key in that keyboard order, but without the actual depression of the "1" key in that order, and also initiates an automatic division operation in the same manner as a depression of the division control key 516. As transfer key 566 is depressed, bellcrank 597 is turned in a counter-clockwise direction in Fig. 2 to rock arm 602, shaft 604, and arm 606, thereby rocking arm 611 and turning shaft 612 (clockwise in Fig. 6) so that arm 616 bears against ear 625 and imparts a corresponding clockwise movement to arm 624 and to bail 622, which turn as a unit and are rotatably supported on shaft 612. The clockwise rocking movement which is thus imparted to bail 622 causes the actuating interponent 636 to form a camming engagement with the upwardly extending arm 635 if bracket 634 so as to move the associated selection slide 27a forwardly a differential amount equivalent to the displacement normally caused by the depression of the "1" key in that order, which simulated movement of slide 27a positions the forward selection gear 28 on the associated square shaft 36 (Fig. 6) so as to cause the actuating drum 29 to automatically enter a value of "1" into the accumulator dial for that order at the beginning of the interregister transfer operation. The rocking movement thus imparted to bail 622 by arm 616 also rocks hook 627 on the rearwardly extending shank or right angle extension 626 clockwise from the normally disabled position shown in Fig. 7 to the enabled or active position shown in Fig. 8; while the free end of arm 616 presses against stud 617 and rocks lever 618 in a clockwise direction as viewed in Fig. 9. The movement which is thereby imparted to lever 618, in opposition to the action of return spring 621, causes lever 618 to bear against ear 632 on the forward end 1304 of the division control slide 304 so as to move the latter rearwardly to the active position shown in Fig. 8. Hence, an automatic division operation is initiated in the same manner as is normally caused by a depression of the division control key 516. As the connecting lever 312 is rocked (clockwise in Fig. 7) to bring notch 317 into engagement with pin 318 at the beginning of the division operation, link 327 is moved downwardly and rocks bellcrank 328 counter-clockwise to the position shown in Fig. 8, wherein pin 628 thereon is moved into latching engagement with hook 627 on arm 626, thus holding slide 27a in its predetermined adjusted position so as to automatically retain a value of "1" in the selection mechanism for that order for the duration of the transfer operation. Although the counter blockout control 560 (Fig. 1a) has previously been moved to its active positiin so as to block out and disable the counter during addition, subtraction, and multiplication operations, the automatic division mechanism temporarily overrides the counter blockout control 560 during automatic division so as to enable the quotient to be entered into the revolutions counter wheels 61, as is fully disclosed and described in the above-mentioned Machado Patent No. 2,366,345. Hence, the revolutions counter wheels 61 are operable to receive for arithmetic accumulation therein products or other subtotal values to be automatically transferred by the automatic division mechanism from the accumulator, or product register dials 22 to the revolutions counter 61. At the end of each such interregister transfer operation, the effectiveness of the counter blockout control 560 is again restored so as to render the revolutions counter 61 inoperative during any combination of addition, subtraction, and multiplication operations required in computing and entering the next subtotal value in the particular series of computations in the dials 22 for subsequent transfer and arithmetic accumulation in the revoltions counter 61 with values previously entered and stored therein as a grand total.

Whenever it is desired to transfer a product or value negatively from the accumulator or product register dials 22 to the revolutions counter 61, only the right-hand back transfer key 566 is depressed, and the interregister transfer mechanism functions in the same manner as in the positive transfer of values, with the exception that pin 539 remains in engagement with upper slot 540 (Fig. 4) to cause the counter wheels 61 to register negatively while the accumulator, or product register dials 22 are engaged for subtractive registration. Hence, the revolutions counter 61 and dials 22 register in the same sense during the negative transfer of values to the counter, which values may be arithmetically combined and accumulated with values previously entered either positively or negatively and stored as grand totals in the revolutions counter wheels 61 by previous operations of the interregister transfer mechanism. At the conclusion of a series of related computations involving the repeated operation of such a transfer mechanism, the accumulator, or product register dials 22 and counter dials 61 can be reset and restored to zero either by manually operating the respective clear rack controls 558 and 559 (Fig. 1A), or by depressing the return clear key 576 in the usual manner.

It will be recalled that the initiation of each transfer operation by a depression of the right transfer key 566, automatically enters a divisor of "1" into the selection mechanism of predetermined order of the machine, such as the sixth keyboard order, and the automatic division mechanism is operated by moving the division control slide 304 rearwardly to the active position shown in Fig. 8. Upon the initiation of this division operation, control slide 304 is immediately returned to its normally inactive position (Fig. 7), but pin 628 on bellcrank 328 remains in engagement with the hooked end of the latching arm 624, as shown in Fig. 8, for the duration of the transfer operation. Hence, pin 628 retains arm 624 and bail 622 in a predetermined angular position on the supporting shaft 612, in which position plate 636 (Fig. 6) coacts with bracket 634 so as to preset the associated selection slide 27a in such a manner that a divisor of "1" is automatically entered into the selection mechanism of the machine for the duration of the transfer operation, without the necessity of manually depressing the "1" key in the preselected keyboard order which includes slide 27a. At the conclusion of each such transfer operation, however, connecting arm 312 is rocked counter-clockwise as shown in Fig. 7 so as to release notch 317 from engagement with pin 318 on plus-minus slide 128, and link 327 is raised so as to rock bellcrank 328 clockwise as shown in Fig. 7 and release pin 628 from engagement with the hook 627 provided on arm 626. The interregister transfer mechanism is thus released from operative engagement with the automatic division mechanism at the end of each such transfer operation, thereby enabling spring 631 (Fig. 6) to rock arm 624 and bail 622 to its normally inactive position wherein the actuating member 636 is moved out of engagement with the associated bracket 634 (Fig. 6) and the selection slide 27a is returned to the normal functional control of the value entering keys 26 in that order. In this manner, the divisor of "1" is automatically entered into the selection mechanism of the machine only during operation of the back transfer mechanism, and normal functioning is restored to the selector slide 27a under the control of the associated manually depressible amount keys 26 upon completion of each such transfer operation.

Although it is often desirable to associate the transfer mechanism of the instant invention with a particular centrally located keyboard order by installing the selection slide 27a and attaching the cam plate 636 to bail 622 (Fig. 6) in a central position within the keyboard, the plate 636 can be adjustably moved to any other desired keyboard order by inserting the screw 637 in the hole 633 corresponding to the newly selected order, and the selector slide 27a having the coacting bracket 634 thereon, can easily be transferred to the newly selected position so as to relocate the fixed position of the decimal point in a manner best suited to the requirements of a particular series of related and frequently reoccurring calculations, particularly when the number of decimal places required for the subtotal values to be accumulated in the revolutions counter dials 61 as grand totals are known in advance. Hence, the automatic entry of a divisor of "1" upon the depression of the transfer key 566 may be adjustably changed to any desired keyboard order so as to arithmetically accumulate in the revolutions counter 61 frequently reoccurring decimal values of a particular magnitude. Moreover, values resulting from addition, subtraction, and multiplication operations may be transferred positively or negatively from the accumulator, or product register dials 22 to the counter dials 61 in a fully automatic manner for arithmetic accumulation with other subtotal values similarly transferred to and stored in the revolutions counter as grand totals while performing a series of consecutive computations of the same, or of a related type.

Although the lug or bracket 634 has been described as being so shaped and positioned with respect to the coacting actuating member 636 so as to differentially move one selection slide 27a to a predetermined position corresponding to a value of "1" in a particular keyboard order, it will be readily apparent to those skilled in the art that the bracket 634 and the actuating member 636 can be variously shaped and arranged so as to differentially move the associated selection slide 27a to a position corresponding to any desired keyboard value higher than "1" upon depression of the control key 566. It will also be readily apparent that any preset numerical constant can be automatically entered as a divisor into the selection mechanism of the machine. Upon depression of control key 566, preset and differentially adjusted interponents similar to bracket 634 and actuating member 636 secured to bail 622 in holes 633 as at 637 (Fig. 5) will cause a value of from "1" to "9" in each order to be entered into a plurality of adjacent orders of the keyboard. In this manner a frequently used constant divisor factor may be rapidly and accurately entered into the selection mechanism by the single depression of control key 566 without the necessity of depressing the value entering keys 26. Hence, a dividend previously entered into the dials 22 can be automatically divided by this predetermined and preset constant divisor by depressing the control keys 565, 566, and the true quotient will be recorded in the revolutions counter dials 61.

We claim:

1. In a calculating machine provided with a keyboard having at least one value selecting slide for each order thereof, a shiftable carriage having an accumulator therein operable to receive values entered into the said selecting slides by the said keyboard, a revolutions counter in the said carriage provided with a tens-transfer mechanism, an automatic division mechanism, and selectively operable means for disabling the said revolutions counter in all computing operations with the exception of automatic division, the combination which comprises a movable member for initiating an automatic division operation, a transfer control key, a value selecting slide in one predetermined order of the said keyboard having a bracket secured thereto, a bail disposed transversely across the said keyboard and adapted to receive a predetermined angular displacement upon depression of the said transfer key, a cam actuator removably secured to the said bail and operable to coact with the said bracket upon depression of the said transfer key to cause the said selecting slide to move to a predetermined adjusted position equivalent to the depression of the "1" key in that keyboard order, a latch movable with the said bail for retaining the said selection slide in the said predetermined adjusted position during operation of the automatic division mechanism, means operated by a depression of the said transfer control key for positioning the said movable member in such a manner as to initiate an automatic division operation, and means for releasing the said latch and returning the said selecting slide to its normally inactive position upon the completion of each such automatic division operation initiated by a depression of the said transfer control key.

2. In a calculating machine provided with an ordinal selection mechanism, an accumulator adapted to register values entered into the said selection mechanism, a revolutions counter, and an automatic division mechanism, the combination which comprises, a transfer control key operable to transfer a positive value from the said accumulator to the said revolutions counter, a shaft disposed transversely of the machine, means operable by said key to rock said shaft, a normally inactive control arm operable with said shaft to initiate a division operation, and a value selecting member adapted for cooperation with said control arm to enter the value of "1" into an intermediate order of the said selection mechanism.

3. In a calculating machine provided with an ordinal selection mechanism, an accumulator adapted to register values entered into the said selection mechanism, a revolutions counter, and an automatic division mechanism, the combination which comprises, a transfer control key operable to transfer a positive value from the said accumulator to the said revolutions counter, a shaft disposed transversely of the machine, means operable by said key to rock said shaft, a normally inactive control arm operable with said shaft to initiate a division operation, a value selecting member adapted for yieldable cooperation with said control arm to enter the value of "1" into an intermediate order of the said selection mechanism, and a latching means for maintaining the said value selecting member in its adjusted position thereby holding the value of "1" in the said selection mechanism until the division operation has terminated.

References Cited in the file of this patent

UNITED STATES PATENTS

| Number | Name | Date |
|---|---|---|
| 1,827,837 | Chase | Oct. 20, 1931 |
| 1,900,042 | Brown | Mar. 7, 1933 |
| 2,294,111 | Friden | Aug. 25, 1942 |
| 2,325,388 | Friden | July 27, 1943 |
| 2,366,345 | Machado | Jan. 2, 1945 |